United States Patent
McManamon et al.

(10) Patent No.: US 11,467,759 B2
(45) Date of Patent: Oct. 11, 2022

(54) SYSTEM AND METHOD FOR EXTENDING PATH LENGTH OF A WAVE SIGNAL USING ANGLE MULTIPLEXING

(71) Applicant: LyteLoop Technologies, LLC, Great Neck, NY (US)

(72) Inventors: Paul Francis McManamon, Dayton, OH (US); Daniel Damaghi, Great Neck, NY (US); Ohad Harlev, Closter, NJ (US); Armand Vedadi-Comte, New York, NY (US); Alan Eli Willner, Los Angeles, CA (US); Charles Rocco Palanzo, Franklin Lakes, NJ (US); Ryan Justin Howard, Brooklyn, NY (US)

(73) Assignee: LYTELOOP TECHNOLOGIES, LLC, Great Neck, NY (US)

( * ) Notice: Subject to any disclaimer, the term of this patent is extended or adjusted under 35 U.S.C. 154(b) by 0 days.

(21) Appl. No.: 17/002,174

(22) Filed: Aug. 25, 2020

(65) Prior Publication Data
US 2020/0393988 A1    Dec. 17, 2020

Related U.S. Application Data

(63) Continuation of application No. 16/536,358, filed on Aug. 9, 2019, now Pat. No. 10,789,009.
(Continued)

(51) Int. Cl.
*G06F 3/06* (2006.01)
*H04J 14/02* (2006.01)
(Continued)

(52) U.S. Cl.
CPC .......... *G06F 3/0652* (2013.01); *G06F 3/0604* (2013.01); *G06F 3/0679* (2013.01);
(Continued)

(58) Field of Classification Search
CPC .... G06F 3/0652; G06F 3/0679; G06F 3/0604; H04B 10/2513; H04B 10/118; H04J 14/02; G02B 6/293
(Continued)

(56) References Cited

U.S. PATENT DOCUMENTS

| 3,141,153 A | 7/1964 | Klein |
| 3,164,809 A | 1/1965 | Pearce et al. |

(Continued)

FOREIGN PATENT DOCUMENTS

| CA | 2266132 A1 | 9/2000 |
| EP | 0080841 A2 | 11/1982 |

(Continued)

OTHER PUBLICATIONS

A. E. Willner, et al., Star Couplers With Gain Using Multiple Erbium-Doped Fibers Pumped With a Single Layer, IEEE Photonics Technology Letters, Mar. 1991, pp. 250-252, vol. 3, No, 3. IEEE Xplore Digital Library, United States.

(Continued)

*Primary Examiner* — Abbas H Alagheband
(74) *Attorney, Agent, or Firm* — Amster, Rothstein & Ebenstein LLP

(57) ABSTRACT

A system and method for extending the path length of an electromagnetic wave signal traveling between apertures is disclosed. One such system may comprise N arrays having $M_1$ through $M_N$ apertures, respectively, wherein $N \geq 2$, $M_1 \geq 2$, and each of $M_2$ through $M_N \geq 1$, a substantial number of the $M_1$ apertures in a first array is configured to send the electromagnetic wave signal to a substantial number of the $M_2$ apertures in a second array through the $M_N$ apertures in a N-th array, the substantial number of the $M_2$ apertures in the second array through the $M_N$ apertures in the N-th array receiving the electromagnetic wave signal from the substan- (Continued)

tial number of the $M_1$ apertures in the first array is configured to redirect the received electromagnetic wave signal back to the substantial number of the $M_1$ apertures in the first array, and the substantial number of the $M_1$ apertures in the first array is further configured to send the electromagnetic wave signal to another one of the $M_1$ apertures in the first array after receiving the redirected electromagnetic wave signal from a $M_N$-th aperture in the N-th array.

60 Claims, 4 Drawing Sheets

Related U.S. Application Data

(60) Provisional application No. 62/717,107, filed on Aug. 10, 2018.

(51) Int. Cl.
   *H04B 10/2513* (2013.01)
   *H04B 10/118* (2013.01)
   *G02B 6/293* (2006.01)

(52) U.S. Cl.
   CPC .......... *H04B 10/2513* (2013.01); *H04J 14/02* (2013.01); *G02B 6/293* (2013.01); *H04B 10/118* (2013.01)

(58) Field of Classification Search
   USPC .......................................................... 398/79
   See application file for complete search history.

(56) References Cited

U.S. PATENT DOCUMENTS

| | | | |
|---|---|---|---|
| 3,229,258 A | 1/1966 | Heibeck et al. | |
| 3,277,450 A | 10/1966 | Edson | |
| 3,350,697 A | 10/1967 | Hirvela | |
| 3,411,142 A | 11/1968 | Lee et al. | |
| 4,014,166 A | 3/1977 | Cateora et al. | |
| 4,136,929 A | 1/1979 | Suzaki | |
| 4,166,212 A | 8/1979 | Judeinstein | |
| 4,180,814 A | 12/1979 | Barton | |
| 4,359,733 A | 11/1982 | O'Neill | |
| 4,455,651 A | 6/1984 | Baran | |
| 4,469,397 A | 9/1984 | Shaw et al. | |
| 4,473,270 A | 9/1984 | Shaw | |
| 4,479,701 A | 10/1984 | Newton et al. | |
| 4,586,779 A | 5/1986 | Huignard et al. | |
| 4,588,255 A | 5/1986 | Tur et al. | |
| 4,652,079 A | 3/1987 | Shaw et al. | |
| 4,653,042 A | 3/1987 | d'Auria et al. | |
| 4,656,666 A | 4/1987 | Piekenbrock | |
| 4,708,421 A | 11/1987 | Desurvire et al. | |
| 4,738,503 A | 4/1988 | Desurvire et al. | |
| 4,744,083 A | 5/1988 | O'Neill et al. | |
| 4,815,804 A | 3/1989 | Desurvire et al. | |
| 4,856,862 A | 8/1989 | Passmore et al. | |
| 4,877,952 A | 10/1989 | Halemane et al. | |
| 4,896,948 A | 1/1990 | Dono et al. | |
| 4,923,267 A | 5/1990 | Su | |
| 4,974,931 A | 12/1990 | Poole | |
| 5,058,060 A | 10/1991 | Su | |
| 5,144,322 A | 9/1992 | Gabriel | |
| 5,319,482 A | 6/1994 | Tsuchiya et al. | |
| 5,335,098 A | 8/1994 | Leyva et al. | |
| 5,339,284 A * | 8/1994 | Kaiser ................. H01Q 3/2611 367/905 |
| 5,392,154 A | 2/1995 | Chang et al. | |
| 5,438,337 A | 8/1995 | Aguado | |
| 5,440,669 A | 8/1995 | Rakuljic et al. | |
| 5,533,154 A | 7/1996 | Smith | |
| 5,555,127 A | 9/1996 | Abdelkader et al. | |
| 5,566,261 A | 10/1996 | Hall et al. | |
| 5,602,838 A | 2/1997 | Kartalopoulos | |
| 5,740,117 A | 4/1998 | Bona et al. | |
| 5,844,700 A | 12/1998 | Jeganathan et al. | |
| 5,862,286 A | 1/1999 | Imanishi et al. | |
| 5,896,213 A * | 4/1999 | Nagahori ................ H04J 14/08 398/100 |
| 5,978,130 A | 11/1999 | Fee et al. | |
| 5,991,069 A | 11/1999 | Jander | |
| 6,002,916 A | 12/1999 | Lynch | |
| 6,035,081 A | 3/2000 | Poustie et al. | |
| 6,043,918 A | 3/2000 | Bozzay et al. | |
| 6,144,486 A | 11/2000 | Bennett et al. | |
| 6,172,926 B1 | 1/2001 | Drayer | |
| 6,275,479 B1 | 8/2001 | Snell et al. | |
| 6,301,037 B1 | 10/2001 | Fischer et al. | |
| 6,304,354 B2 | 10/2001 | Carlson | |
| 6,317,095 B1 | 11/2001 | Teshirogi et al. | |
| 6,317,232 B1 | 11/2001 | Fee et al. | |
| 6,347,099 B1 | 2/2002 | da Silva et al. | |
| 6,366,356 B1 | 4/2002 | Brosnan et al. | |
| 6,437,890 B1 | 8/2002 | Scheps | |
| 6,452,719 B2 | 9/2002 | Kinoshita | |
| 6,535,314 B1 | 3/2003 | Mendenhall et al. | |
| 6,580,552 B2 | 6/2003 | Welch | |
| 6,609,840 B2 | 8/2003 | Chow et al. | |
| 6,647,163 B2 | 11/2003 | Song | |
| 6,674,754 B1 | 1/2004 | Ofek | |
| 6,819,817 B2 | 11/2004 | Kaneko | |
| 6,826,335 B1 | 11/2004 | Grudinin et al. | |
| 6,829,439 B1 | 12/2004 | Sidorovich et al. | |
| 6,839,520 B1 | 1/2005 | Dreischer et al. | |
| 6,850,364 B2 | 2/2005 | Xie et al. | |
| 6,912,075 B1 | 6/2005 | Ionov et al. | |
| 6,917,739 B2 | 7/2005 | Chen | |
| 6,930,825 B2 | 8/2005 | Nagel et al. | |
| 6,973,271 B2 | 12/2005 | Farmer et al. | |
| 7,103,239 B2 | 9/2006 | Kish, Jr. et al. | |
| 7,103,280 B1 | 9/2006 | Ionov et al. | |
| 7,110,651 B2 | 9/2006 | Golowich et al. | |
| 7,149,431 B2 | 12/2006 | Jung et al. | |
| 7,167,286 B2 | 1/2007 | Anderson et al. | |
| 7,174,067 B2 | 2/2007 | Murshid et al. | |
| 7,177,510 B2 | 2/2007 | Ramachandran | |
| 7,180,447 B1 * | 2/2007 | Jacomb-Hood .......... H01Q 3/36 342/373 |
| 7,199,343 B2 | 4/2007 | Mosley | |
| 7,235,150 B2 | 6/2007 | Bischel et al. | |
| 7,369,085 B1 * | 5/2008 | Jacomb-Hood .......... H01Q 3/36 342/372 |
| 7,450,618 B2 | 11/2008 | Dantus et al. | |
| 7,542,679 B2 | 6/2009 | Price | |
| 7,557,365 B2 * | 7/2009 | Gorrell .................. H01J 25/34 250/200 |
| 7,729,398 B2 | 6/2010 | Livingston | |
| 7,733,930 B2 | 6/2010 | Livingston | |
| 7,742,209 B2 * | 6/2010 | Curtis .................. G11B 7/0065 359/10 |
| 7,742,210 B2 | 6/2010 | Raguin et al. | |
| 7,756,169 B2 | 7/2010 | Livingston et al. | |
| 7,796,487 B2 | 9/2010 | Chu et al. | |
| 7,843,791 B2 | 11/2010 | Kwon et al. | |
| 7,950,812 B2 | 5/2011 | Roes et al. | |
| 8,036,537 B2 | 10/2011 | Cai | |
| 8,232,028 B2 | 7/2012 | Askham | |
| 8,253,625 B2 | 8/2012 | Kim | |
| 8,305,863 B2 | 11/2012 | Tatsuta et al. | |
| 8,417,125 B2 | 4/2013 | Chand et al. | |
| 8,532,486 B2 | 9/2013 | Stead et al. | |
| 8,582,972 B2 | 11/2013 | Small et al. | |
| 8,699,888 B2 | 4/2014 | Scaffardi et al. | |
| 8,913,894 B2 | 12/2014 | Coleman et al. | |
| 9,077,577 B1 | 7/2015 | Ashrafi et al. | |
| 9,176,280 B2 | 11/2015 | Li et al. | |
| 9,188,798 B2 | 11/2015 | Taylor | |
| 9,213,095 B2 * | 12/2015 | Huizing .................. G01S 7/021 |
| 9,503,186 B2 | 11/2016 | Kawanishi et al. | |
| 9,570,811 B2 | 2/2017 | Ohshima et al. | |
| 9,609,402 B2 | 3/2017 | Long et al. | |
| 9,625,878 B2 | 4/2017 | Fontecchio et al. | |

(56) References Cited

U.S. PATENT DOCUMENTS

| | | | |
|---|---|---|---|
| 9,712,239 B2 | 7/2017 | Murshid et al. | |
| 9,749,080 B2 | 8/2017 | Lam et al. | |
| 9,760,061 B2 | 9/2017 | Ayres et al. | |
| 9,812,845 B1 | 11/2017 | Lee et al. | |
| 9,843,388 B1 | 12/2017 | Astakhov et al. | |
| 9,912,409 B2 | 3/2018 | Jia et al. | |
| 9,917,646 B2 | 3/2018 | Turgeon et al. | |
| 10,001,603 B2 | 6/2018 | Martinelli | |
| 10,073,417 B2 | 9/2018 | Ashrafi et al. | |
| 10,084,532 B2 | 9/2018 | Buer et al. | |
| 10,103,799 B2 | 10/2018 | Luddy et al. | |
| 10,122,456 B2 * | 11/2018 | Hreha | H04B 7/18513 |
| 10,142,012 B2 | 11/2018 | Welle | |
| 10,305,560 B2 | 5/2019 | Adachi et al. | |
| 10,312,999 B2 | 6/2019 | Neuman | |
| 10,326,526 B2 | 6/2019 | Ashrafi | |
| 10,411,811 B2 | 9/2019 | Willner et al. | |
| 10,606,146 B2 | 3/2020 | Heine | |
| 10,827,911 B2 | 11/2020 | Ramachandran et al. | |
| 2001/0012142 A1 | 8/2001 | Carlson | |
| 2002/0075536 A1 | 6/2002 | Cao | |
| 2002/0093450 A1 * | 7/2002 | Martin-Neira | G01S 3/46 |
| | | | 342/351 |
| 2002/0196488 A1 * | 12/2002 | Myers | G02F 3/00 |
| | | | 398/164 |
| 2003/0007230 A1 | 1/2003 | Kaneko et al. | |
| 2003/0128365 A1 | 7/2003 | Strandjord et al. | |
| 2003/0219258 A1 | 11/2003 | Ellis et al. | |
| 2004/0151428 A1 | 8/2004 | Nikonov | |
| 2004/0190845 A1 | 9/2004 | Chen | |
| 2004/0246583 A1 | 12/2004 | Mueller et al. | |
| 2005/0025486 A1 * | 2/2005 | Zhong | H04J 14/0227 |
| | | | 398/79 |
| 2005/0084801 A1 | 4/2005 | El-Hafidi et al. | |
| 2005/0232182 A1 * | 10/2005 | Shattil | H04J 13/0077 |
| | | | 370/319 |
| 2006/0173983 A1 * | 8/2006 | Naito | G06F 15/16 |
| | | | 709/223 |
| 2007/0072546 A1 | 3/2007 | Jenkin et al. | |
| 2007/0081785 A1 | 4/2007 | Hays | |
| 2007/0098052 A1 * | 5/2007 | Budic | G01S 7/023 |
| | | | 342/13 |
| 2008/0002981 A1 * | 1/2008 | Valley | H04B 7/18521 |
| | | | 398/124 |
| 2008/0008076 A1 | 6/2008 | Raguin et al. | |
| 2008/0144164 A1 | 6/2008 | Metivier | |
| 2008/0239428 A1 * | 10/2008 | Bell | G11B 7/135 |
| | | | 359/30 |
| 2009/0202191 A1 | 8/2009 | Ramachandran | |
| 2009/0219959 A1 | 9/2009 | Murison et al. | |
| 2010/0269143 A1 | 10/2010 | Rabowsky | |
| 2010/0279604 A1 | 11/2010 | Wood | |
| 2010/0322058 A1 | 12/2010 | Hutt et al. | |
| 2012/0063752 A1 | 3/2012 | Cochran | |
| 2012/0188865 A1 | 7/2012 | Michaelis et al. | |
| 2013/0120831 A1 | 5/2013 | McClean et al. | |
| 2013/0175450 A1 | 7/2013 | Scherer et al. | |
| 2013/0216180 A1 | 8/2013 | Tan et al. | |
| 2013/0315590 A1 | 11/2013 | Thou | |
| 2014/0334284 A1 * | 11/2014 | Byun | H04J 15/00 |
| | | | 370/208 |
| 2015/0104141 A1 | 4/2015 | Logunov et al. | |
| 2015/0244458 A1 | 8/2015 | Erkmen et al. | |
| 2015/0288542 A1 | 10/2015 | Ashrafi et al. | |
| 2016/0043794 A1 * | 2/2016 | Ashrafi | H04B 7/0671 |
| | | | 370/329 |
| 2016/0204866 A1 | 7/2016 | Boronson et al. | |
| 2016/0204896 A1 | 7/2016 | Yu et al. | |
| 2017/0034250 A1 | 2/2017 | Sobhani et al. | |
| 2017/0139079 A1 | 5/2017 | Alfano et al. | |
| 2017/0280211 A1 * | 9/2017 | Damaghi | G02B 6/2938 |
| 2017/0302048 A1 | 10/2017 | Li et al. | |
| 2018/0131447 A1 | 5/2018 | Soares et al. | |
| 2019/0074893 A1 * | 3/2019 | Kaen | H04B 7/19 |
| 2019/0334609 A1 | 10/2019 | Alavi et al. | |
| 2020/0050959 A1 * | 2/2020 | Ashrafi | G06N 3/0635 |
| 2020/0277087 A1 | 9/2020 | Kaen | |

FOREIGN PATENT DOCUMENTS

| | | |
|---|---|---|
| EP | 174540 A2 | 3/1986 |
| EP | 883322 B1 | 7/2000 |
| EP | 1462883 A2 | 9/2004 |
| EP | 1742408 A2 | 1/2007 |
| JP | H5-72591 A1 | 3/1993 |
| JP | 2759346 B2 | 5/1998 |
| JP | 2014529758 A | 11/2014 |
| KR | 10-2011-0131300 A | 12/2011 |
| KR | 10-2012-0130011 A | 11/2012 |
| KR | 101494821 B1 | 3/2015 |
| KR | 10-1524793 B1 | 6/2015 |
| RU | 2155447 C1 | 8/2000 |
| RU | 2579610 C2 | 4/2016 |
| WO | 9508778 A1 | 3/1995 |
| WO | 9844512 A1 | 10/1998 |
| WO | 2000019559 A1 | 4/2000 |
| WO | 2002/097467 A2 | 12/2002 |
| WO | 2004023192 A2 | 3/2004 |
| WO | 2011142849 A2 | 11/2011 |
| WO | 2016022309 A1 | 2/2016 |
| WO | 2016164038 A1 | 10/2016 |
| WO | 2017165429 A1 | 9/2017 |
| WO | 2020144319 A1 | 7/2020 |

OTHER PUBLICATIONS

A. Hasegawa, H. Toda, M. Shikata, Y. Ozeki, T, Suzaki, Y. Ueno, K. Tajima, Experimental demonstration of the compressed optical packet multiplexing scheme, Journal of Optical Networking, vol. 1, No. 7 (Jul. 2002), pp. 221-236, 42304250.

Anjali Agarwal, et al., All-Optical Loadable and Erasable Storage Buffer Based on Parametric Nonlinearity in Fiber, Journal of Lightwave Technology, Jul. 2005, pp. 2229-2238, vol. 23, Issue No. 7, United States.

Bernd Friedrichs et al., Error-Control Coding and Packet Processing for Broadband Relay Satellite Networks with Optical and Microwave Links, 2012 6th Advanced Satellite Multimedia Systems Conference (ASMS) and 12th Signal Processing for Space Communications Workshop (SPSC) (2012), pp. 101-110.

Bo E. Miller and Yuzuru Takashima, Cavity Techniques for Holographic Data Storage Recording, Optics Express, Mar. 14, 2016, vol. 24, Issue 6, pp. 6300-6317, Optical Society of America, United States.

E. V. Carrera, R. Bianchini, Disk caching with an optical ring, Appl. Opt. Dec. 10, 2000:39 (35):666380 (Camrera 2000).

European Search Report and Written Opinion, dated Nov. 5, 2019 issued in corresponding European Application 17 770 999.5 (Search Report 4 pgs.; Opinion 3 pgs.; totaling 7 pgs.).

F. Della Valle, et al., Extremely Long Decay Time Optical Cavity, Optics Express, May 6, 2014, pp. 11570-11577, vol. 22, Issue 10, Optical Society of America, United States.

Federal Institute of Industrial Property, Search Report dated Apr. 1, 2019.

Federal Institute of Industrial Property, Search Report dated Jun. 4, 2019 (issued Jul. 29, 2019).

Francois Leo et al., Temporal cavity solitons in one-dimensional Kerr media as bits in all-optical buffer, Nature Photonics, 4:471-476, May 23, 2010.

G. S. Mcdonald et al., Spatial solitary-wave optical memory. Journal of the Optical Society of America B (Opted Physics) (J. Opt. Soc. Am.), 7(7):1328-1335, Jul. 1990.

G.D. Bartolini, D.K. Serkland, P. Kumar, W.L. Kath. (1997), All-optical storage of a picosecondpulse packet using parametric ampfification. IEEE Photomcs Technology Letters, 9(7), 1020-1022 [Bartolini 1997].

Geoffrey W. Burr et al., Angle and Space Multiplexed Holographic Storage Using the 90° Geometry, Optics Communications, May 15, 1995, pp. 49-55, vol. 117, Issues 1-2, United States.

(56) References Cited

OTHER PUBLICATIONS

Geoffrey W. Burr et al., Volume Holographic Data Storage At an Areal Density of 250 Gigapixels/In.2, Optics Letters, vol. 26, No. 7, Apr. 1, 2001, pp. 444-446, United States.
J .H. Reif, A. Tyagi. An Optical Delay Line Memory Model with Efficient Algorithms, Optical Engineering, 36(9), (1997).
J. Ashley et al., Holographic Data Storage, IBM Journal of Research and Development, vol. 44, Issue May 2000, pp. 341-368, United States.
Keiji Kuroda and Yuzo Yoshikuni, Two-Wavelength Pump-Probe Technique Using Single Distributed Feedback Laser Array to Probe Gain Recovery of an Erbium-Doped Fiber Amplifier, Optical Fiber Technology, Mar. 2017, pp. 20-22, vol. 34, Elsevier, Inc.
Mansour I. Irshid and Moshen Kavehrad, Star Couplers With Gain Using Fiber Amplifiers, IEEE Photonics Technology Letters, Jan. 1992, pp. 58-60, vol. 4, No. 1, IEEE Xplore Digital Library, United States.
Obulapathi N. Challa et al., Distributed Data Storage on CubeSat Clusters, Advances in Computing, 3(3):36-49 (2013).
Paul F. Mcmanamon et al., Laser Radar, Progress and Opportunities in Active Electra-Optical Sensing, National Research Council of the National Academies, 2014.
PCT International Search Report, dated Aug. 22, 2017 in International Application No. PCT/US2017/023431 (4 pages).
Robert W. Boyd et al., Applications of Slow Light in Telecommunications, Optics & Photonics News, 17(4):18-23, Apr. 2006.
S.L. Tsao, T.Y. Chen, Comparison of Two 1550 rim Ultra Narrow-Band Optical infinite Impulse Response Filters for High-Speed Optical Signal Processing, Optical Storage and Optical Information Processing, Proceedings of SPIE, vol. 4081, 2000.
Shankar Pidishety et al., Investigation of scalability of all-fiber fused mode selective coupler for generating multiple OAM states, Proceedings of International Conference on Fiber Optics and Photonics, Jan. 2016.
Singapore Search Report and Written Opinion, dated Aug. 20, 2019 issued in Singapore Application No. 10201901665X.
Stephane Gagnon et al., Recent developments in satellite laser communications: Canadian context. Proc. International Conference on Space Optical Systems and Applications (ICSOS) (2012).
The International Bureau of WIPO, International Preliminary Report on Patentability for Intl. Appl. No. PCT/US2017/023431, dated Sep. 25, 2018, 7 pages, Geneva, Switzerland.
V.W.S. Chan, K. L. Hall, E. Modiano, K. A. Rauschenback. Architectures and Technologies for High-Speed Optical Data Networks, Journal of Lightwave Technology, vol. 16, Issue: 12, Dec. 1998.
Paul Marks, It's a Cloud, but Not as We Know It, ACM News, Communications of the ACM, Jul. 8, 2019, United States.
KIPO Notice of Prelimary Rejection (English Translation), dated Nov. 25, 2019, in S. Korean Patent Application No. 10-2018-7030269 (3 pages).
PCT International Search Report and Written Opinion in International Application No. PCT/US2019/044744 dated Oct. 29, 2019 (11 pages).
PCT International Search Report and Written Opinion in International Application No. PCT/US2019/045825 dated Nov. 1, 2019 (7 pages).
PCT International Search Report and Written Opinion in International Application No. PCT/US2019/059523 dated Jan. 22, 2020 (12 pages).
JPO Notice of Preliminary Rejection (English Translation), dated Jan. 14, 2020, in Japanese Patent Application No. 2018-550424 (4 pages).
JPO Notice of Preliminary Rejection (English Translation), dated Jan. 14, 2020, in Japanese Patent Application No. 2019-056078 (4 pages).
KIPO Notice of Preliminary Rejection (With English Translation), dated Jul. 21, 2020, in S. Korean Patent Application No. 10-2019-7005794 (10 pages).
U.S. Appl. No. 16/262,225, Office Action dated Jul. 21, 2020.
U.S. Appl. No. 16/672,221, Office Action dated Jun. 25, 2020.
U.S. Appl. No. 16/262,225, Office Action dated Oct. 15, 2020, 12 pp.
U.S. Appl. No. 16/529,479, Office Action dated Dec. 18, 2020, 10 pp.
U.S. Appl. No. 16/672,221, Office Action dated Dec. 16, 2020, 34 pp.
Israel Patent Office, Israeli Patent Application No. 27826, Office Action, dated Oct. 29, 2020, 10 pp., Israel.
Japanese Patent Office, Japanese Patent Application No. 2019-056078, Decision of Refusal, dated Nov. 25, 2020, 6 pp., Japan.
Japanese Patent Office, Japanese Patent Application No. 2018-550424, Notice of Reasons for Refusal, dated Nov. 25, 2020, 5 pp., Japan.
Extended European Search Report and Search Opinion for EP Application No. 20 184 820.7, dated Oct. 29, 2020, (Search Report 4 pgs.; Opinion 1 pg.; totaling 5 pgs.).
Extended European Search Report and Search Opinion for EP Application No. 20 184 821.5, dated Nov. 4, 2020 (Search Report 5 pgs.; Opinion 6 pgs.; totaling 11 pgs.).
Russian Federal Institute of Industrial Property, Office Action and Search Report in Russian Patent Application No. 2020141783, dated Feb. 19, 2021. (Office Action and translation 8 pgs; Search Report and translation 4 pgs.; totaling 12 pgs.).
Japanese Patent Office, Preliminary Notice of Reasons for Rejection in Japanese Patent Application No. 2020-553470, dated Feb. 24, 2021. (Preliminary Notice and translation 7 pgs.).
Korean Intellectual Property Office, Notice of Preliminary Rejection in Korean Patent Application No. 10-2021-7000241, dated Apr. 7, 2021. (Notice and translation 4 pgs.).
European Patent Office, Extended European Search Report in EPO Application No. 19848330.7, dated Aug. 3, 2021, 10 pp., Munich, Germany.

* cited by examiner

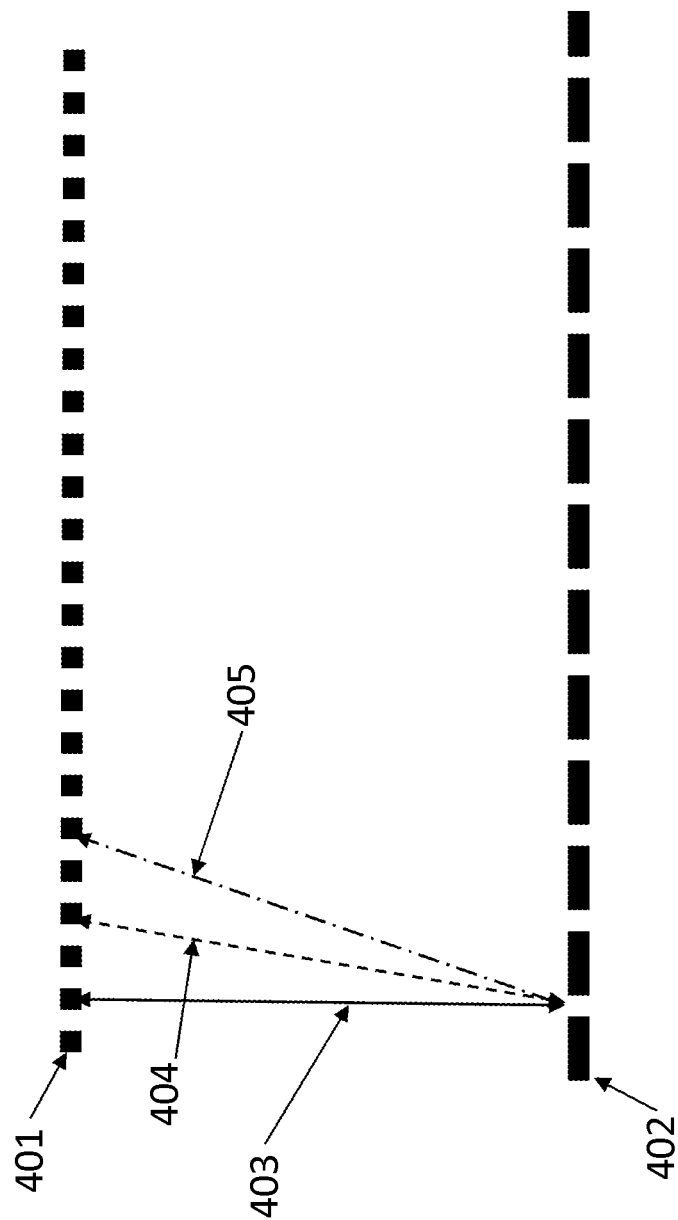

SYSTEM AND METHOD FOR EXTENDING PATH LENGTH OF A WAVE SIGNAL USING ANGLE MULTIPLEXING

CROSS-REFERENCE TO RELATED APPLICATIONS

The present application is a continuation of U.S. application Ser. No. 16/536,358, filed Aug. 9, 2019 entitled SYSTEM AND METHOD FOR EXTENDING PATH-LENGTH OF A WAVE SIGNAL USING ANGLE MULTIPLEXING which claims the benefit of and priority to U.S. Provisional Patent Application No. 62/717,107, filed Aug. 10, 2018, the entire contents of which are incorporated herein by reference.

FIELD OF INVENTION

The present invention relates to a system and method for extending the path length of a wave signal.

BACKGROUND OF THE INVENTION

The expansion of data centers, broadband communications and computationally intensive signal processing is driving the demand for high capacity data storage that consumes less power. Modern data centers also often require a rapid access to the same data stored on a same common drive to perform, for example, high performance computing (HPC). In addition, there is an increasing interest among many actors within the information technology (IT) storage industry (e.g., end customers, data centers, in-system programmers (ISP), in-circuit programmers (ICP), etc.) in being able to erase sensitive data (e.g., government data, military data) definitively and completely in an immediate manner.

Currently, solid state drives (SSDs), such as non-volatile NAND flash memory-based drives, and hard disk drives (HDDs) are examples of storage devices used to store data in data centers. Conventional data centers based on those solid state-based storage devices have a variety of drawbacks. For example, data storage using those conventional storage devices consumes a large amount of power and requires expensive maintenance. In addition, data storage involving many of those conventional storage devices generates a large amount of heat, necessitating cooling systems, which in turn require additional cost and energy consumption. Moreover, the throughput at which data can be read from or written to those conventional electromagnetic wave storage devices is limited by the speed of electronics to, for example, a few Gb/s. Additionally, when data is erased from a conventional non-volatile solid-state memory, an imprint of the erased data typically remains and with proper skills and technology, one could recover the erased data. Furthermore, to scale up the data center using those conventional storage devices, it is necessary to either buy more of the storage devices or replace the current storage devices with better-performing ones. Accordingly, constructing and upgrading data centers using the conventional storage devices is a costly and time-consuming process.

There is, therefore, a need for a data storage apparatus and method that overcomes one or more of the above and other deficiencies of data storage using the conventional storage devices.

SUMMARY OF THE INVENTION

It has been shown that an alternative data storage approach is to store data in motion in a data storage loop. It has now been found that the above and related objects of the present invention are obtained in the form of several related aspects, including a system and method for extending the path length of a wave signal using angle multiplexing.

More particularly, the present invention relates to a system for extending a path length of an electromagnetic wave signal, the system comprising N arrays having $M_1$ through $M_N$ apertures, respectively, wherein $N \geq 2$, $M_1 \geq 2$, and each of $M_2$ through $M_N \geq 1$, a substantial number of the $M_1$ apertures in a first array is configured to send the electromagnetic wave signal to a substantial number of the $M_2$ apertures in a second array through the $M_N$ apertures in a N-th array, the substantial number of the $M_2$ apertures in the second array through the $M_N$ apertures in the N-th array receiving the electromagnetic wave signal from the substantial number of the $M_1$ apertures in the first array is configured to redirect the received electromagnetic wave signal back to the substantial number of the $M_1$ apertures in the first array, and the substantial number of the $M_1$ apertures in the first array is further configured to send the electromagnetic wave signal to another one of the $M_1$ apertures in the first array after receiving the redirected electromagnetic wave signal from a $M_N$-th aperture in the N-th array.

In at least one embodiment, the another one of the $M_1$ apertures in the first array is adjacent to the $M_1$ aperture in the first array that receives the redirected electromagnetic wave signal from a $M_N$-th aperture in the N-th array.

In at least one embodiment, the substantial number of the M1 apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the system further comprises a dispersion compensation device configured to direct substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

The present invention also relates to a system for extending a path length of an electromagnetic wave signal, the system comprising N arrays having $M_1$ through $M_N$ apertures, respectively, wherein $N \geq 2$, $M_1 \geq 2$, and each of $M_2$ through $M_N \geq 1$, a substantial number of the $M_1$ apertures in a first array is configured to send the electromagnetic wave signal to a substantial number of the $M_2$ apertures in a second array through the $M_N$ apertures in a N-th array, the substantial number of a first aperture in the second array through a $(M_N-1)$-th aperture in the N-th array, if $M_N \geq 2$, and through a $M_{N-1}$-th aperture in the (N−1)-th array, if $M_N=1$, receiving the electromagnetic wave signal from the substantial number of the $M_1$ apertures in the first array is configured to redirect the received electromagnetic wave signal back to the substantial number of the $M_1$ apertures in the first array, and a $M_N$-th aperture in the N-th array is configured to send the electromagnetic wave signal to another one of the $M_1$ apertures in the first array after receiving the electromagnetic wave signal from the substantial number of the $M_1$ apertures in the first array.

In at least one embodiment, the another one of the $M_1$ apertures in the first array is adjacent to the substantial number of the $M_1$ apertures in the first array.

In at least one embodiment, the substantial number of the $M_1$ apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the system further comprises a dispersion compensation device configured to direct substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

The present invention further relates to a system for extending a path length of an electromagnetic wave signal, the system comprising N arrays having $M_1$ through $M_N$ apertures, respectively, wherein $N \geq 2$, $M_1 \geq 2$, and each of $M_2$ through $M_N \geq 1$, a first aperture in the second array is configured to send the electromagnetic wave signal to a first aperture in the first array, a substantial number of the $M_1$ apertures in a first array is configured to send the electromagnetic wave signal to a substantial number of the $M_2$ apertures in a second array through the $M_N$ apertures in a N-th array, except that the first aperture in the first array is configured not to send the electromagnetic wave signal to the first aperture in the second array, the substantial number of a first aperture in the second array through a $(M_N-1)$-th aperture in the N-th array, if $M_N \geq 2$, and through a $M_{N-1}$-th aperture in the (N−1)-th array, if $M_N=1$, receiving the electromagnetic wave signal from the substantial number of the $M_1$ apertures in the first array is configured to redirect the received electromagnetic wave signal back to the substantial number of the $M_1$ apertures in the first array, and a $M_N$-th aperture in the N-th array is configured to send the electromagnetic wave signal to another one of the $M_1$ apertures in the first array after receiving the electromagnetic wave signal from the substantial number of the $M_1$ apertures in the first array.

In at least one embodiment, the another one of the $M_1$ apertures in the first array is adjacent to the substantial number of the $M_1$ apertures in the first array.

In at least one embodiment, the substantial number of the $M_1$ apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the system further comprises a dispersion compensation device configured to direct substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

In addition, the present invention also relates to a method for extending a path length of an electromagnetic wave signal traversing between N arrays having $M_1$ through $M_N$ apertures, respectively, wherein $N \geq 2$, $M_1 \geq 2$, and each of $M_2$ through $M_N \geq 1$, the method comprising sending, by a substantial number of the $M_1$ apertures in a first array, the electromagnetic wave signal to a substantial number of the $M_2$ apertures in a second array through the $M_N$ apertures in a N-th array, receiving, by the substantial number of the $M_2$ apertures in the second array through the $M_N$ apertures in the N-th array, the electromagnetic wave signal from the substantial number of the $M_1$ apertures in the first array, redirecting, by the substantial number of the $M_2$ apertures in the second array through the $M_N$ apertures in the N-th array, the received electromagnetic wave signal back to the substantial number of the $M_1$ apertures in the first array, and after receiving, by the substantial number of the $M_1$ apertures in the first array, the redirected electromagnetic wave signal from a $M_N$-th aperture in the N-th array, sending, by the substantial number of the $M_1$ apertures in the first array, the electromagnetic wave signal to another one of the $M_1$ apertures in the first array.

In at least one embodiment, the another one of the $M_1$ apertures in the first array is adjacent to the $M_1$ aperture in the first array that receives the redirected electromagnetic wave signal from a $M_N$-th aperture in the N-th array.

In at least one embodiment, the substantial number of the $M_1$ apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the method further comprises directing, by using a dispersion compensation device, substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

The present invention further relates to a method for extending a path length of an electromagnetic wave signal traversing between N arrays having $M_1$ through $M_N$ apertures, respectively, wherein N≥2, $M_1$≥2, and each of $M_2$ through $M_N$≥1, the method comprising sending, by a substantial number of the $M_1$ apertures in a first array, the electromagnetic wave signal to a substantial number of the $M_2$ apertures in a second array through the $M_N$ apertures in a N-th array, receiving, by the substantial number of a first aperture in the second array through a $(M_N-1)$-th aperture in the N-th array, if $M_N$≥2, and through a $M_{N-1}$-th aperture in the (N−1)-th array, if $M_N$=1, the electromagnetic wave signal from the substantial number of the $M_1$ apertures in the first array, redirecting, by the substantial number of the first aperture in the second array through the $(M_N-1)$-th aperture in the N-th array, if $M_N$≥2, and through the $M_{N-1}$-th aperture in the (N−1)-th array, if $M_N$=1, the received electromagnetic wave signal back to the substantial number of the $M_1$ apertures in the first array, and after receiving, by a $M_N$-th aperture in the N-th array, the electromagnetic wave signal from the substantial number of the $M_1$ apertures in the first array, sending, by the $M_N$-th aperture in the N-th array, the electromagnetic wave signal to another one of the $M_1$ apertures in the first array.

In at least one embodiment, the another one of the $M_1$ apertures in the first array is adjacent to the substantial number of the $M_1$ apertures in the first array.

In at least one embodiment, the substantial number of the $M_1$ apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the method further comprises directing, by using a dispersion compensation device, substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

Additionally, the present invention relates to a method for extending a path length of an electromagnetic wave signal traversing between N arrays having $M_1$ through $M_N$ apertures, respectively, wherein N≥2, $M_1$≥2, and each of $M_2$ through $M_N$≥1, the method comprising sending, by a first aperture in the second array, the electromagnetic wave signal to a first aperture in the first array, sending, by a substantial number of the $M_1$ apertures in a first array, the electromagnetic wave signal to a substantial number of the $M_2$ apertures in a second array through the $M_N$ apertures in a N-th array, except that the first aperture in the first array does not send the electromagnetic wave signal to the first aperture in the second array, receiving, by the substantial number of a first aperture in the second array through a $(M_N-1)$-th aperture in the N-th array, if $M_N$≥2, and through a $M_{N-1}$-th aperture in the (N−1)-th array, if $M_N$=1, the electromagnetic wave signal from the substantial number of the $M_1$ apertures in the first array, except that the first aperture in the second array does not receive the electromagnetic wave signal from the first aperture in the first array, redirecting, by the substantial number of the first aperture in the second array through the $(M_N-1)$-th aperture in the N-th array, if $M_N$≥2, and through a $M_{N-1}$-th aperture in the (N−1)-th array, if $M_N$=1, the received electromagnetic wave signal back to the substantial number of the $M_1$ apertures in the first array, and after receiving, by a $M_N$-th aperture in the N-th array, the electromagnetic wave signal from the substantial number of the $M_1$ apertures in the first array, sending, by the $M_N$-th aperture in the N-th array, the electromagnetic wave signal to another one of the $M_1$ apertures in the first array.

In at least one embodiment, the another one of the $M_1$ apertures in the first array is adjacent to the substantial number of the $M_1$ apertures in the first array.

In at least one embodiment, the substantial number of the $M_1$ apertures in the first array includes each one of the $M_1$ apertures. In at least one embodiment, the substantial number of the $M_2$ apertures in the second array through the $M_N$ apertures in the N-th array includes each one of the $M_2$ apertures in the second array through the $M_N$ apertures in the N-th array.

In at least one embodiment, the electromagnetic wave signal has a single wavelength.

In at least one embodiment, the electromagnetic wave signal comprises a plurality of signals each having a different wavelength in a multi-wavelength system.

In at least one embodiment, the method further comprises directing, by using a dispersion compensation device, substantially all of the plurality of signals from one aperture to another aperture.

In at least one embodiment, the dispersion compensation device comprises a multi-wavelength beam directing device using an achromatic Fourier transform lens.

In at least one embodiment, the apertures in the first array comprise volume holographic gratings, corner cube retroreflectors, diffraction gratings, mirrors, partial regenerators, or full regenerators.

In at least one embodiment, the apertures in at least one of the second array through the N-th array comprise volume holographic gratings, corner cube retroreflectors, diffraction gratings, mirrors, partial regenerators, or full regenerators.

In at least one embodiment, the apertures in the first array are located in one or more sets of one or more satellites, and the apertures in at least one of the second array through the N-th array are located in one or more sets of one or more satellites.

In at least one embodiment, the apertures in the first array through the N-th array are located within a substantially sealed cavity.

In at least one embodiment, the apertures may be located in outer space, in free space, either in the atmosphere or in partial or intense vacuum.

Although specific features, capabilities and advantages have been enumerated above, various embodiments may include some, none, or all of the enumerated features, capabilities and advantages. These and other technical features, capabilities and advantages of the disclosed subject matter, along with the invention itself, will be more fully understood after a review of the following figures, detailed descriptions and claims.

BRIEF DESCRIPTION OF THE DRAWINGS

Exemplary embodiments of the present invention will be described with references to the accompanying figures, wherein:

FIG. 4 is a schematic diagram of partial implementation of angle multiplexing for multi-wavelength electromagnetic wave signals in accordance with an exemplary embodiment of the present invention.

DETAILED DESCRIPTION OF PREFERRED EMBODIMENTS

Figure 1:
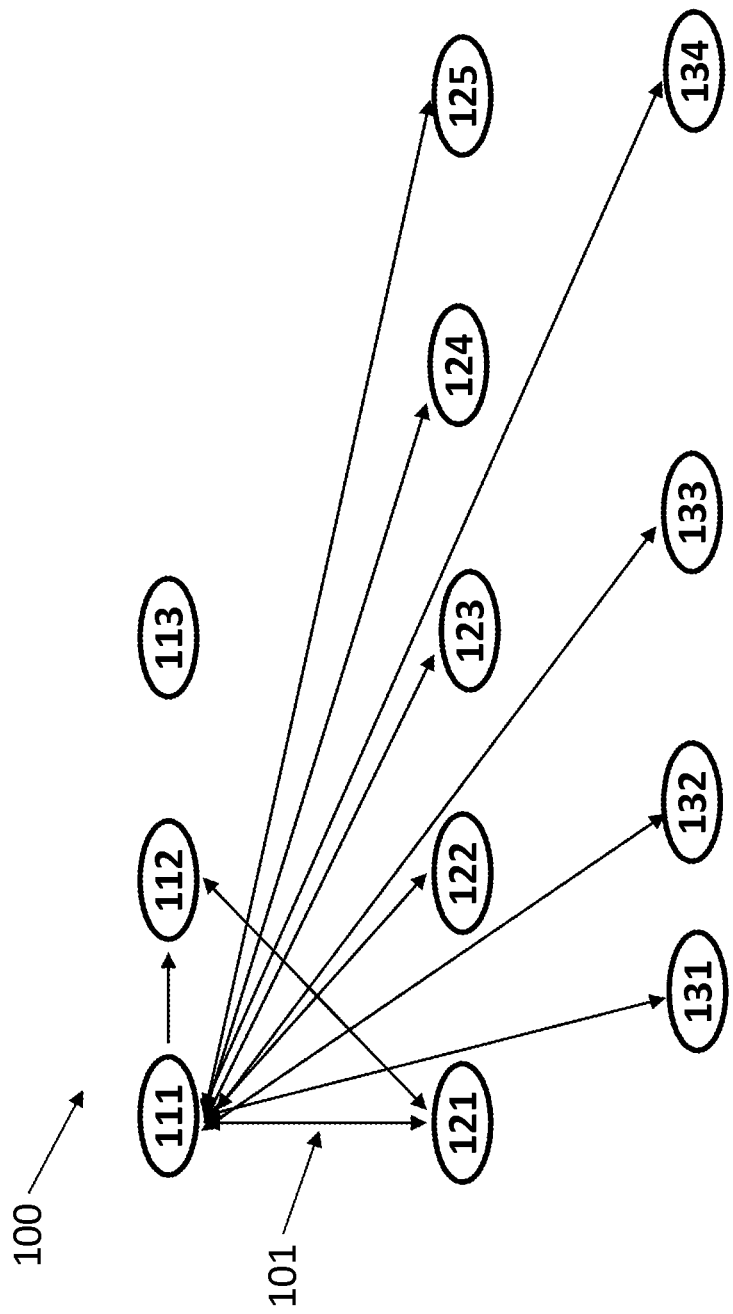
FIG. 1 is a schematic diagram of partial implementation of angle multiplexing in accordance with an exemplary embodiment of the present invention.

Information or any kind of data can be stored as electromagnetic waves (e.g., generated by lasers, optical beam, radio frequency (RF) signals, other types of electromagnetic wave signals, to name a few), which can be transmitted and/or reflected between structures or within structures in various transmission media (e.g., free space, vacuum, crystals, nonlinear media, optical waveguides, optical fibers, to name a few). The terms "electromagnetic wave signal" and "electromagnetic wave beam" are used herein interchangeably. Electromagnetic radiation or electromagnetic beam as used herein may include any kind of electromagnetic signal, including a laser beam or signal, a maser beam or signal, an optical beam or signal, or any type of wired or wireless signal, including acoustic waves, radio waves, IR radiation, UV radiation, microwave-band transmission, or any combination of more than one of the foregoing. While referred to herein sometimes simply as a laser beam or signal, other types of optical signals and other types of electromagnetic radiation transmissions, including radio waves, microwaves, IR, UV and combinations of bandwidths of wavelengths of electromagnetic radiation, whether guided, shaped, phased, or none of the foregoing, are also intended to be included.

A recirculating loop may be used to store "data in motion" by keeping electromagnetic wave signals, which may carry data, in a continuous motion, transmitted and/or reflected between or within structures and regenerated (e.g., by signal amplification or regeneration) as needed. The recirculating loop may be formed by, for example, satellites or other vessels that reflect or otherwise retransmit the data in free space. The recirculating loop may comprise a waveguide, such as an optical fiber. Various systems and methods of storing data in motion in a recirculating loop are described in U.S. patent application Ser. No. 15/465,356, which has been published as US 2017/0280211 A1 and is incorporated by reference herein in its entirety.

In embodiments, systems for storing electromagnetic wave signals in a recirculating loop may be configured to extinguish or "turn off" the electromagnetic wave signals stored therein. When the electromagnetic wave signals are extinguished, data stored therein is definitively and instantly lost and cannot be recovered, unlike the data erased from a solid-state memory.

To increase the data storage time and capacity for such systems, electromagnetic wave signals need to be held or "delayed" in a recirculating loop as long as possible. There may be other applications for the delay of electromagnetic signals, such as the ability to use a shorter coherence length master oscillator in a long range lidar or radar.

The electromagnetic wave signal path length is a distance traveled by an electromagnetic wave signal in a recirculating loop, and the electromagnetic wave signal storage time is the electromagnetic wave signal path length divided by the speed of light, or electromagnetic wave signal, within a medium or vacuum. By extending the electromagnetic wave signal path length and thereby increasing the electromagnetic wave signal storage time, one can store a greater amount of data in motion without requiring a higher data rate.

Disclosed are systems and methods for extending the path length of an electromagnetic wave signal by using a space division multiplexing technique called "angle multiplexing." As used herein, the term "angle multiplexing" refers to a technique for extending the electromagnetic wave signal path length by increasing (e.g., multiplying) the number and/or lengths of paths between apertures, or between sets of apertures, that an electromagnetic wave signal uses to travel a recirculation loop (e.g., traversing the recirculation loop only in part, a single time, or multiple times). For example, the angle multiplexing technique can extend the electromagnetic wave signal path length by creating an electromagnetic wave signal path that goes from a first aperture in a first set of apertures to and from every aperture, or a large number of apertures, in a second set of apertures, and then from a second aperture in the first set of apertures to and from every aperture, or a large number of apertures, in the second set of apertures, and so on. Since the electromagnetic wave signal traverses back and forth across the same region many times, the electromagnetic wave signal path length can be extended within a given space.

The order of travel of the electromagnetic wave signal from one aperture, or aperture array, to another aperture, or aperture array, can be flexible, as may be chosen by the designer of that particular embodiment. Furthermore, the number of apertures can be flexible, as may be chosen by the designer of that particular embodiment. In embodiments, all available apertures in participating arrays may be used. In alternative embodiments, a substantial number of the available apertures may be used.

As used herein, the term "aperture" refers to any optical/photonic/electromagnetic (including, as defined herein, acoustic) element or device configured to receive, send, reflect, redirect and/or re-transmit an electromagnetic wave signal. Examples of apertures include, but are not limited to, mirrors, gratings, such as diffraction gratings or volume holographic gratings, corner cube retroreflectors, photonic crystal structure, optical devices comprising gradient index materials, partial regenerators, full regenerators and any appropriate combinations thereof, to name a few. The term "a set of apertures" refers to a discrete set of apertures (e.g., an arbitrary number of arrays each having an arbitrary number of apertures), or a limited number of apertures that may be long in one direction, with portions of the long aperture acting as independent apertures. For example, in FIG. 4, each of the top and bottom set of elements 401, 402 illustrates a single, long aperture. Thus, in embodiments, a number of discrete apertures can function as a single aperture, and aperture arrays may be subdivided into multiple subapertures.

For example, in a system having two arrays of apertures facing each other, the electromagnetic wave signal path length can be extended by an electromagnetic wave signal traveling over all possible paths, or over a substantial number of possible paths, between each of the apertures in the first array and each of the apertures in the second array. In embodiments, this can be generalized for a system having an arbitrary number of arrays each having an arbitrary number of apertures.

The angle multiplexing technique can significantly extend the electromagnetic wave signal path length among multiple apertures, resulting in a longer distance the electromagnetic wave signal travels, and hence a longer electromagnetic wave signal storage time in a recirculating loop. At a given data rate, such an increase in the electromagnetic wave signal storage time can increase the amount of data in motion that can be stored by the recirculation loop.

Figure 2:
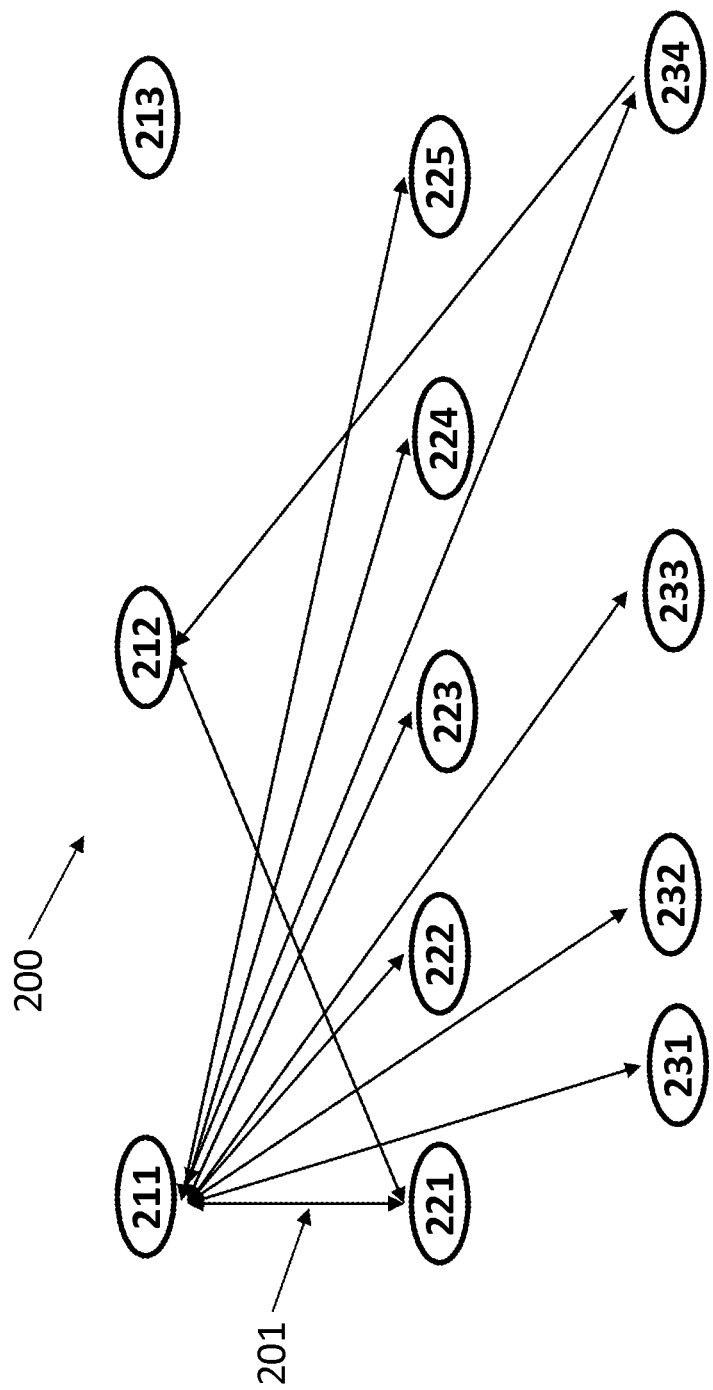
FIG. 2 is a schematic diagram of partial implementation of angle multiplexing in accordance with another exemplary embodiment of the present invention.
Figure 3:
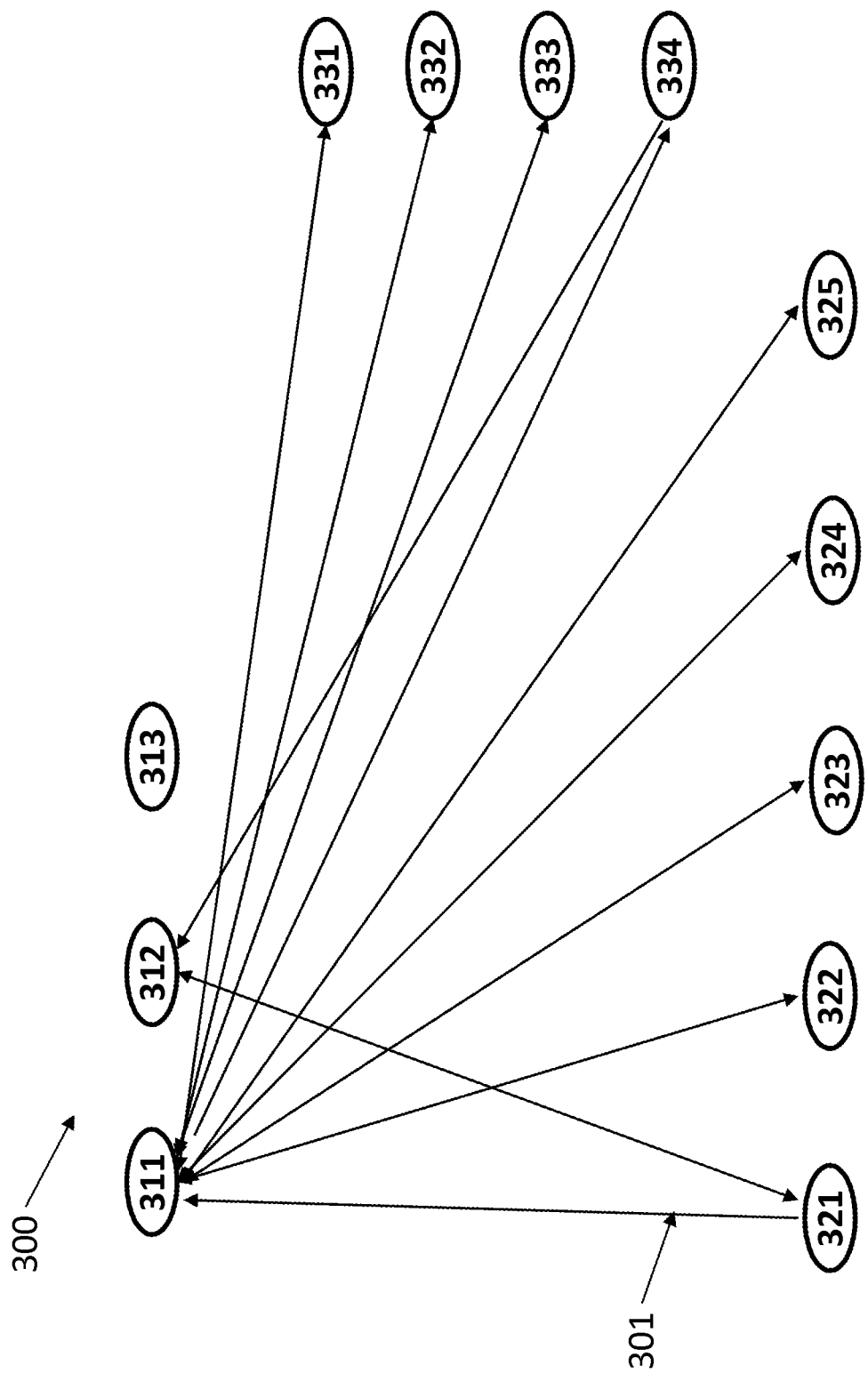
FIG. 3 is a schematic diagram of partial implementation of angle multiplexing in accordance with yet another exemplary embodiment of the present invention.

Referring now to the drawings and in particular to FIGS. 1-3, there are provided schematic diagrams illustrating partial implementation of angle multiplexing between multiple apertures in accordance with exemplary embodiments. While each of these drawing figures shows three arrays each comprising three, four, or five apertures, the number of arrays and the number of apertures in each array are not restricted by the present invention. Furthermore, while FIGS. 1-3 show using all of the available paths between available apertures, a given implementation may use only a substantial number of the available paths. The angle multiplexing technique may be applied to a system having any number of arrays, such as two or more arrays, and any number of apertures, such as one or more apertures, in each array, provided that an electromagnetic wave signal can travel between the arrays and apertures. The angle multiplexing technique may also be applied to a system having any kinds of physical or geometrical arrangements of arrays and apertures (e.g., linear, circular, planar, or random arrangement of apertures, to name a few). In addition, the position of each array relative to each of the other arrays can be flexible and is not restricted by the present invention as long as an electromagnetic wave signal can travel between the arrays. Furthermore, the position of each aperture in one array relative to each of the other apertures within the same array can be flexible and is not restricted by the present invention as long as an electromagnetic wave signal can travel between the apertures. Likewise, the position of each aperture in one array relative to each of apertures in the other arrays may be flexible and is not restricted by the present invention as long as an electromagnetic wave signal can travel between the apertures. For example, angle multiplexing may be implemented over distances ranging from as little as one meter or less to 100,000 km or greater. In another example, a 60-meter-long array of apertures may be used on each of two sides of a storage system to implement angle multiplexing. In embodiments, an electromagnetic wave signal may travel between apertures via a waveguide or optical fiber. In embodiments utilizing satellites, an array may refer to apertures on multiple satellites, with only a single aperture, or more than one aperture, in the array being on a given satellite. Accordingly, the schematic diagrams in FIGS. 1-3 do not necessarily reflect the actual physical arrangements of arrays and the apertures within each array and are not necessarily drawn to scale.

The angle multiplexing technique may be applied to arrays of apertures placed at any location as long as an electromagnetic wave signal can travel between the apertures. For example, apertures in one or more arrays may be located in one or more sets of one or more satellites in outer space and apertures in at least one of the other arrays may be located in one or more sets of one or more satellites in outer space. In embodiments, the apertures may be located in outer space, in free space, and may be located in the atmosphere, in a partial vacuum, or in an intense vacuum.

In another example, arrays of apertures may be located within a partially open or substantially sealed cavity of any size or shape. As used herein, the term "cavity" refers to any structure that includes at least one partially or fully enclosed space (e.g., partly open or fully sealed enclosure) of any size or shape where an electromagnetic wave signal can travel. The enclosed space within a cavity may be hollow, and such a hollow space in a near vacuum condition has an index of refraction of approximately one, which allows electromagnetic wave signals to travel at near the speed of light in vacuum. Alternatively, the enclosed space within a cavity may be filled with a material (e.g., solid, crystal, amorphous material, liquid, etc.) having an index of refraction greater than one, where electromagnetic wave signals travel more slowly than in vacuum. In another example, a cavity may be a solid material (e.g., crystal, amorphous solid, to name a few) enclosed by its own interior and exterior surfaces. Preferably, such a material filling the cavity is configured to allow electromagnetic wave signals to travel at a low loss. Exemplary geometrical shapes of a cavity include a cubic cavity, a rectangular shaped cavity, a tube cavity, a torus shaped cavity, a spherical cavity, a polyhedron cavity, a parallelogram shaped cavity, a prism shaped cavity and an egg-shaped cavity, to name a few. For example, arrays of apertures implementing angle multiplexing may be located within a rectangular shaped chamber having a length of 100 meters, a width of 30 meters and a height of 2 meters. In embodiments, arrays of apertures implementing angle multiplexing may be located within a sealed cavity substantially under a vacuum condition.

FIG. 1 shows a system 100 of three arrays with a first array having three apertures 111, 112 and 113, a second array having five apertures 121, 122, 123, 124 and 125, and a third array having four apertures 131, 132, 133 and 134, in accordance with an exemplary embodiment. FIG. 1 schematically illustrates partial implementation of angle multiplexing, wherein an electromagnetic wave signal 101 may travel the following paths in accordance with the exemplary embodiment: Starting from the first aperture 111 in the first array, the electromagnetic wave signal 101 travels sequentially to each of apertures 121, 122, 123, 124 and 125 in the second array and back to the first aperture 111 in the first array. Once it has been to each of the apertures in the second array, the electromagnetic wave signal 101 then travels sequentially from the first aperture 111 in the first array to each of the apertures 131, 132, 133 and 134 in the third array and back to the first aperture 111 in the first array. Once it has returned from the last aperture in the last array (e.g., aperture 134 in the third array) to the first aperture 111 in the first array, the electromagnetic wave signal 101 may then be sent from the first aperture 111 to an adjacent aperture in the same array (e.g., second aperture 112 in the first array). From the second aperture 112 in the first array, the electromagnetic wave signal 101 travels sequentially to each of apertures 121, 122, 123, 124, 125, 131, 132, 133 and 134 in the second and third arrays and back to the second aperture 112 in the first array. To simplify the figure, only the travels by the electromagnetic wave signal 101 up to and including the round-trip travel from aperture 112 to aperture 121 and back to aperture 112 are shown in FIG. 1 and subsequent travels by the electromagnetic wave signal 101 are not shown in FIG. 1. Once it has returned from the last aperture in the last array (e.g., aperture 134 in the third array) to the second aperture 112 in the first array, the electromagnetic wave signal 101 may then be sent from the aperture 112 to an adjacent aperture in the same array (e.g., third aperture 113). The analogous processes may be repeated until the electromagnetic wave signal 101 returns from the last aperture in the last array (e.g., aperture 134 in the third array) to the last aperture in the first array (e.g., aperture 113).

In embodiments, the optical path for the electromagnetic wave signal 101 may end at this point (e.g., the electromagnetic wave signal 101 is retrieved). In alternative embodiments, the electromagnetic wave signal 101 may be sent from the last aperture 113 in the first array back to the first aperture 111 in the first array and the entire processes may be repeated all over again. In yet another alternative embodiment, the entire processes may be conducted in reverse order from this point by sending the electromagnetic wave signal 101 from the last aperture in the first array (e.g., aperture 113) to the second to last aperture in the first array (e.g., aperture 112) and then ultimately back to the first aperture 111 in the first array, from which the entire processes may be repeated again in forward order. In yet another alternative embodiment, the electromagnetic wave signal 101 may be sent from the last aperture 113 in the first array to the first aperture 121 in the second array. Starting from the first aperture 121 in the second array, apertures in the second array may conduct processes that are analogous to the processes initially conducted by the apertures in the first array.

In embodiments, the electromagnetic wave signal may traverse all or some of the paths between different apertures and different arrays in any pre-determined, re-arranged, tunable, and/or reconfigurable manner that is different from the exemplary processes described above with regard to FIG. 1 and below with regard to FIGS. 2-4. For example, in embodiments, once the electromagnetic wave signal has returned from the last aperture in the last array (e.g., aperture 134 in the third array in FIG. 1) to the first aperture in the first array (e.g., aperture 111 in FIG. 1), the electromagnetic wave signal may then be sent from the first aperture (e.g., aperture 111) to any other aperture in the first array (e.g., aperture 113 in FIG. 1). In alternative embodiments, the other aperture is adjacent the first aperture.

FIG. 2 shows a system 200 of three arrays with a first array having three apertures 211, 212 and 213, a second array having five apertures 221, 222, 223, 224 and 225, and a third array having four apertures 231, 232, 233 and 234, in accordance with an exemplary embodiment. FIG. 2 schematically illustrates partial implementation of angle multiplexing, wherein an electromagnetic wave signal 201 may travel the following paths in accordance with the exemplary embodiment: Starting from the first aperture 211 in the first array, the electromagnetic wave signal 201 travels sequentially to each of apertures 221, 222, 223, 224 and 225 in the second array and back to the first aperture 211 in the first array. Once it has been to each of the apertures in the second array, the electromagnetic wave signal 201 then travels sequentially from the first aperture 211 in the first array to each of first aperture through second to last aperture 231, 232 and 233 in the third array and back to the first aperture 211 in the first array. Once the electromagnetic wave signal 201 has returned from the second to last aperture in the last array (e.g., aperture 233 in the third array) to the first aperture 211 in the first array, the first aperture 211 in the first may then send the electromagnetic wave signal 201 to the last aperture in the last array (e.g., aperture 234 in the third array), which may then redirect the electromagnetic wave signal 201 to an aperture in the first array (e.g., aperture 212) that is adjacent to the first aperture 211 in the first array. From the second aperture 212 in the first array, the electromagnetic wave signal 201 travels sequentially to each of apertures 221, 222, 223, 224, 225, 231, 232 and 233 in the second and third arrays and back to the second aperture 212 in the first array. To simplify the figure, only the travels by the electromagnetic wave signal 201 up to and including the round-trip travel from aperture 212 to aperture 221 and back to aperture 212 are shown in FIG. 2 and subsequent travels by the electromagnetic wave signal 201 are not shown in FIG. 2. Once the electromagnetic wave signal 201 has returned from the second to last aperture in the last array (e.g., aperture 233 in the third array) to the second aperture 212 in the first array, the second aperture 212 in the first array may send the electromagnetic wave signal 201 to the last aperture in the last array (e.g., aperture 234 in the third array), which may then redirect the electromagnetic wave signal 201 to an aperture in the first array (e.g., aperture 213) that is adjacent to the second aperture 212 in the first array. The analogous processes may be repeated until the electromagnetic wave signal 201 is sent from the last aperture in the first array (e.g., aperture 213) to the last aperture in the last array (e.g., aperture 234).

In embodiments, the optical path for the electromagnetic wave signal 201 may end at this point (e.g., the electromagnetic wave signal 201 is retrieved). In alternative embodiments, the electromagnetic wave signal 201 may be sent from the last aperture in the last array (e.g., aperture 234) back to the first aperture 211 in the first array and the entire processes may be repeated all over again. In yet other alternative embodiments, the entire processes may be conducted in reverse order from this point by sending the electromagnetic wave signal 201 from the last aperture in the last array (e.g., aperture 234 in the third array) to the second to last aperture in the first array (e.g., aperture 212) and then ultimately back to the first aperture 211 in the first array, from which the entire processes may be repeated again in forward order. In yet another alternative embodiment, the electromagnetic wave signal 201 may be sent from the last aperture in the last array (e.g., aperture 234) to the first aperture 221 in the second array. Starting from the first aperture 221 in the second array, apertures in the second and third arrays may conduct processes that are analogous to the processes initially conducted by the apertures in the first and third arrays.

In embodiments, the electromagnetic wave signal may traverse all or some of the paths between different apertures and different arrays in any pre-determined, re-arranged, tunable, and/or reconfigurable manner that is different from the exemplary processes described above with regard to FIG. 2. For example, in embodiments, when the electromagnetic wave signal is returned from the last aperture in the last array (e.g., aperture 234 in the third array in FIG. 2) to the first array, it may be returned to any other aperture in the first array (e.g., aperture 213). In alternative embodiments, the other aperture is adjacent to the first aperture.

FIG. 3 shows a system 300 of three arrays with a first array having three apertures 311, 312 and 313, a second array having five apertures 321, 322, 323, 324 and 325, and a third array having four apertures 331, 332, 333 and 334, in accordance with an exemplary embodiment. FIG. 3 schematically illustrates partial implementation of angle multiplexing, wherein an electromagnetic wave signal 301 may travel the following paths in accordance with the exemplary embodiment: Starting from the first aperture 321 in the second array, the electromagnetic wave signal 301 is initially sent to the first aperture 311 in the first array. From the first aperture 311 in the first array, the electromagnetic wave signal 301 then travels sequentially to each of the second aperture through the last aperture 322, 323, 324 and 325 in the second array and back to the first aperture 311 in the first array. The electromagnetic wave signal 301 then travels sequentially from the first aperture 311 in the first array to each of first aperture through second to last aperture 331, 332 and 333 in the third array and back to the first aperture 311 in the first array. Once the electromagnetic wave signal 301 has returned from the second to last aperture in the last array (e.g., aperture 333 in the third array) to the first aperture 311 in the first array, the first aperture 311 in the first may then send the electromagnetic wave signal 301 to the last aperture in the last array (e.g., aperture 334 in the third array), which may then redirect the electromagnetic wave signal 301 to an aperture in the first array (e.g., aperture 312) that is adjacent to the first aperture 311 in the first array. From the second aperture 312 in the first array, the electromagnetic wave signal 301 travels sequentially to each of apertures 321, 322, 323, 324, 325, 331, 332 and 333 in the second and third arrays and back to the second aperture 312 in the first array. To simplify the figure, only the travels by the electromagnetic wave signal 301 up to and including the round-trip travel from aperture 312 to aperture 321 and back to aperture 312 are shown in FIG. 3 and subsequent travels by the electromagnetic wave signal 301 are not shown in FIG. 2. Once the electromagnetic wave signal 301 has returned from the second to last aperture in the last array (e.g., aperture 333 in the third array) to the second aperture 312 in the first array, the second aperture 312 in the first array may send the electromagnetic wave signal 301 to the last aperture in the last array (e.g., aperture 334 in the third array), which may then redirect the electromagnetic wave signal 301 to an aperture in the first array (e.g., aperture 313) that is adjacent to the second aperture 312 in the first array. The analogous processes may be repeated until the electromagnetic wave signal 301 is sent from the last aperture in the first array (e.g., aperture 313) to the last aperture in the last array (e.g., aperture 334).

In embodiments, the optical path for the electromagnetic wave signal 301 may end at this point (e.g., the electromagnetic wave signal 301 is retrieved). In alternative embodiments, the electromagnetic wave signal 301 may be sent from the last aperture in the last array (e.g., aperture 334) back to the first aperture 311 in the first array and the entire processes may be repeated all over again, except that they will now include a roundtrip travel from the first aperture 311 in the first array to the first aperture 321 in the second array and back to the first aperture 311 in the first array. In yet other alternative embodiments, the entire processes may be conducted in reverse order from this point by sending the electromagnetic wave signal 301 from the last aperture in the last array (e.g., aperture 334 in the third array) to the second to last aperture in the first array (e.g., aperture 312) and then ultimately back to the first aperture 311 in the first array, from which the entire processes may be repeated again in forward order, except that they will now include a roundtrip travel from the first aperture 311 in the first array to the first aperture 321 in the second array and back to the first aperture 311 in the first array. In yet another alternative embodiment, the electromagnetic wave signal 301 may be sent from the last aperture in the last array (e.g., aperture 334) to the first aperture 321 in the second array. Starting from the first aperture 321 in the second array, apertures in the second and third arrays may conduct processes that are analogous to the processes initially conducted by the apertures in the first and third arrays.

In embodiments, the electromagnetic wave signal may traverse all or some of the paths between different apertures and different arrays in any pre-determined, re-arranged, tunable, and/or reconfigurable manner that is different from the exemplary processes described above with regard to FIG. 3. For example, in embodiments, when the electromagnetic wave signal is returned from the last aperture in the last array (e.g., aperture 334 in the third array in FIG. 3) to the first array, it may be returned to any other aperture in the first array (e.g., aperture 313). In alternative embodiments, the other aperture is adjacent to the first aperture.

In embodiments, angle multiplexing may be used alone or may be used in combination with other types of multiplexing methods, such as wavelength division multiplexing, spatial mode multiplexing, to name a few, to expand the data storage capacity for a recirculating loop. For example, angle multiplexing may be used in combination with multiple channels for different wavelengths and multiple channels for different spatial modes (e.g., orbital angular modes (OAM)) at each wavelength.

Apertures that may be used to implement angle multiplexing include, but are not limited to, mirrors, gratings, such as diffraction gratings or volume holographic gratings, corner cube retroreflectors, photonic crystal structure, optical devices comprising gradient index materials, partial regenerators, full regenerators and any appropriate combinations thereof, to name a few.

In embodiments, angle multiplexing may be implemented by using volume holographic gratings ("VHGs"), which comprise optical elements configured to perform more than one function. VHGs are diffractive optical elements consisting of a periodic phase, or absorption perturbation, throughout the entire volume of the elements. When an incident electromagnetic wave beam satisfies the Bragg phase matching condition, it is diffracted by the periodic perturbation. For volume phase holograms, it is possible to diffract approximately 100% of the incoming reference light into the signal wave, i.e., full diffraction of an electromagnetic wave beam can be achieved. This high deflection percentage makes VHGs particularly useful for angle multiplexing. For VHGs, the incident electromagnetic wave beam is diffracted only when the Bragg phase-matching condition is met. Hence, VHGs can be made transparent to light coming from certain angles. Due to the limited range of wavelengths and angles over which diffraction occurs, it is possible to have multiple VHGs inside the same volume that work independently and without interfering with each other. For example, if two VHGs are recorded in the same device for two different Bragg wavelengths at the same incidence angle, the device can diffract the two selected wavelengths into different output directions with limited crosstalk. In embodiments, such features and capabilities of VHGs may be used in implementation of angle multiplexing.

In embodiments, angle multiplexing may be implemented by using an electromagnetic wave signal having a single wavelength and using apertures comprising, for example, a combination of corner cube retroreflectors, reflecting surfaces and VHGs.

In embodiments, angle multiplexing may be implemented by an electromagnetic wave signal comprising a plurality of signals each having a different wavelength in a multi-wavelength system. In such embodiments, a dispersion compensation device or method may be used. The dispersion compensation device or method may be configured to direct substantially all of the plurality of signals from one aperture to another aperture such that the signals can all follow the same optical path between apertures simultaneously. According to the grating equation, gratings direct to an angle proportional to the wavelength for small angle directing. Hence, a longer wavelength signal steers to a larger angle, while a shorter wavelength signal steers to a smaller angle. If angle multiplexing requires all the light to go from one specific aperture to another specific aperture, the spread of light from the gratings based on the size of wavelength needs to be eliminated (e.g., dispersive effects need to be compensated). For example, dispersion compensation can be achieved by a multi-wavelength beam directing device using one or more achromatic Fourier transform lenses. Even though those lenses have variable focal length so that their focal length may change, they have a constant back focal distance so that they may focus in the same spot.

In embodiments, angle multiplexing may be implemented by using electromagnetic wave signals having different wavelengths and allowing them to be emitted from an aperture (e.g., dispersive elements) at different angles and to take different optical paths in a recirculating loop, as shown in FIG. 4. FIG. 4 schematically illustrates a partial implementation of angle multiplexing with each of different wavelength electromagnetic wave signals traveling in a different path in accordance with an exemplary embodiment. In FIG. 4, electromagnetic wave signals 403, 404, 405 having different wavelengths are emitted from continuous gratings 402 at different angles and are directed to different apertures 401 on the opposite side. In embodiments, the apertures 401 on the opposite side may comprise continuous corner cube retroreflectors.

In embodiments, one or more amplifiers and/or regenerators may be used to restore some or all aspects of the electromagnetic wave signal to their original or previous conditions. In embodiments, additional devices configured to clean up the electromagnetic wave signal may also be used. An electromagnetic wave signal traveling in a system of multiple apertures may experience loss in intensity and amplitude, spreading of the signal and/or addition of noise and errors due to, for example, multiple reflections at apertures, various dispersive and nonlinear effects, various scattering events and/or spontaneous emission of light. Accordingly, the electromagnetic wave signal may need to be amplified and/or regenerated at various points in time or space while traveling between multiple apertures.

In embodiments, amplifiers and/or regenerators may be placed within some or all of apertures. In embodiments, amplifiers and/or regenerators may be placed outside the apertures and along the electromagnetic wave beam path between the apertures. The amplifiers and/or regenerators are configured to restore the passing electromagnetic wave signal to its original or previous state and/or compensate for any degradation. An amplifier may be any device configured to amplify an electromagnetic wave signal. In embodiments, an amplifier may comprise crystals or optical fibers. In embodiments, the crystals and optical fibers may be doped by fluorescent elements. In embodiments, the optical fiber used in the amplifier may include additional devices at the input to inject the electromagnetic wave signal into the optical fiber, and other devices at the output to restore the electromagnetic wave beam to its original shape and size.

Full signal regeneration is typically called a "3R" process that includes signal retiming, reshaping, and reamplification (or amplification) of the signal. A regenerator may be configured to conduct full electromagnetic wave signal regeneration. Alternatively, the regenerator may be configured to restore only some aspects of the electromagnetic wave signal by re-timing and/or re-shaping and/or re-amplification of the electromagnetic wave signal in part. In embodiments, the regenerator may also be configured to implement error correction to restore lost information or correct errors introduced into the data in motion. The number of regenerators may depend on the number and design of apertures, transmission medium through which the electromagnetic wave signal travels, and/or performance of angle multiplexing, and may span from none to a very large number.

Any apparatus configured to re-amplify, re-shape, and/or re-time the electromagnetic wave signal in full or in part may be used to build regenerators. Regenerators can be implemented in a number of ways. In embodiments, the regenerator may be all-optical or optoelectronic regenerator, wherein the all-optical regenerator is configured to regenerate the electromagnetic wave signal all optically in the optical domain, while the optoelectronic regenerator is configured to convert some, or all, of the electromagnetic wave signal to a corresponding electrical signal in the electrical domain, regenerate the converted electrical signal electrically and convert the regenerated electrical signal to a corresponding electromagnetic wave signal in the optical domain. In embodiments, the regenerator may comprise at least one amplifier and at least one absorber. In embodiments, the regenerator may comprise at least one amplifier configured to operate in a saturation regime. In embodiments, the regenerator may comprise a nonlinear filter configured to provide gain stabilization and reduce noise in the electromagnetic wave signal. In embodiments, the regenerator may comprise crystals or optical fibers. In embodiments, the regenerator may comprise crystals or optical fibers doped by fluorescent elements. In embodiments, the optical fiber used in the regenerator may comprise additional devices at the input to inject the electromagnetic wave signal into the optical fiber, and other devices at the output to restore the electromagnetic wave beam to its original shape and size.

While this invention has been described in conjunction with exemplary embodiments outlined above and illustrated in the drawings, it is evident that the principles of the present invention may be implemented using any number of techniques, whether currently known or not, and many alternatives, modifications and variations in form and detail will be apparent to those skilled in the art. Modifications, additions, or omissions may be made to the systems, apparatuses, and methods described herein without departing from the scope of the present invention. For example, the components of the systems and apparatuses may be integrated or separated. Furthermore, the operations of the systems and apparatuses disclosed herein may be performed by more, fewer, or other components and the methods described may include more, fewer, or other steps. Additionally, steps may be performed in any suitable order.

As defined herein, electromagnetic waves include acoustic waves. Accordingly, storage in motion of information or any kind of data can also be implemented using acoustic (i.e., sound) waves. Representative values for the speed of sound include about 1,500 m/sec in water, about 330 m/sec in air, and about 6,000 m/sec in steel. (There are a range of velocities for each case.) In terms of frequency, sound waves can be in the region of tens of MHz. For example, some medical ultrasound devices operate in the regions of tens of MHz. Usually, lower frequency sound also has less attenuation over distance.

In this regard, if the wave signal carrying information or any kind of data in motion is an acoustic wave, the much lower speed of sound (as compared to the speed of light) enables one to store a greater amount of data in motion without requiring a higher data rate at which the data is introduced.

Information or any kind of data can be transmitted and/or reflected between structures or within structures using acoustic waves in various transmission media (e.g., air and steel, to name a few). Embodiments of storage in motion using acoustic waves could be constructed using such media. For steel, railroad tracks could be a long-distance medium. Acoustic waves can be generated using various sources of vibration, including crystal transducers and speakers, to name a few. Microphones detect acoustic waves. There is a significant base of acoustic technology in sound systems, in systems to eliminate vibration, and in systems to measure vibration. This device technology can be utilized in developing storage in motion systems using acoustic waves in accordance with the principles employed in the embodiments disclosed in the present application.

Accordingly, the exemplary embodiments of the invention, as set forth above, are intended to be illustrative, not limiting, and the spirit and scope of the present invention is to be construed broadly and limited only by the appended claims, and not by the foregoing specification.

In addition, unless otherwise specifically noted, articles depicted in the drawings are not necessarily drawn to scale.

What is claimed is:

1. A system for extending a path length of an electromagnetic wave signal, the system comprising N arrays having $M_1$ through $M_N$ apertures, respectively,
wherein:
N≥2, $M_1$≥2, and each of $M_2$ through $M_N$≥1;
one or more apertures of the $M_1$ apertures in a first array is configured to send the electromagnetic wave signal to one or more apertures of the $M_2$ apertures in a second array through the $M_N$ apertures in a N-th array;
the one or more apertures of the $M_2$ apertures in the second array through the $M_N$ apertures in the N-th array that receives the electromagnetic wave signal from the one or more apertures of the $M_1$ apertures in the first array is configured to redirect the received electromagnetic wave signal back to the one or more apertures of the $M_1$ apertures in the first array; and
the electromagnetic wave signal traverses all or some of the paths between the N arrays.

2. The system of claim 1, wherein the electromagnetic wave signal traverses all or some of the paths between the N arrays in a reconfigurable manner.

3. The system of claim 1, wherein the one or more apertures of the $M_1$ apertures in the first array is further configured to send the electromagnetic wave signal to another aperture of the $M_1$ apertures in the first array after receiving the redirected electromagnetic wave signal from a $M_N$-th aperture in the N-th array.

4. The system of claim 1, wherein:
the one or more apertures of the $M_1$ apertures in the first array comprises each one of the $M_1$ apertures; and
the one or more apertures of the $M_2$ apertures in the second array through the $M_N$ apertures in the N-th array comprises each one of the $M_2$ apertures in the second array through the $M_N$ apertures in the N-th array.

5. The system of claim 1, wherein the electromagnetic wave signal comprises a plurality of signals each having a different wavelength in a multi-wavelength system.

6. The system of claim 5, further comprising a dispersion compensation device configured to direct substantially all of the plurality of signals from one aperture to another aperture.

7. The system of claim 6, wherein the dispersion compensation device comprises a multi-wavelength beam directing device using an achromatic Fourier transform lens.

8. The system of claim 1, wherein the apertures in the first array and in at least one of the second array through the N-th array comprise volume holographic gratings, corner cube retroreflectors, diffraction gratings, mirrors, partial regenerators, or full regenerators.

9. The system of claim 1, wherein:
the apertures in the first array are located in one or more sets of one or more satellites; and
the apertures in at least one of the second array through the N-th array are located in one or more sets of one or more satellites.

10. The system of claim 1, wherein the apertures in the first array through the N-th array are located within a substantially sealed cavity.

11. A system for extending a path length of an electromagnetic wave signal, the system comprising N arrays having $M_1$ through $M_N$ apertures, respectively, wherein:

$N \geq 2$, $M_1 \geq 2$, and each of $M_2$ through $M_N \geq 1$;

one or more apertures of the $M_1$ apertures in a first array is configured to send the electromagnetic wave signal to one or more apertures of the $M_2$ apertures in a second array through the $M_N$ apertures in a N-th array;

the one or more apertures of a first aperture in the second array through a $(M_N-1)$-th aperture in the N-th array, if $M_N > 2$, and through a $M_{N-1}$-th aperture in the (N−1)-th array, if $M_N = 1$, that receives the electromagnetic wave signal from the one or more apertures of the $M_1$ apertures in the first array is configured to redirect the received electromagnetic wave signal back to the one or more apertures of the $M_1$ apertures in the first array; and the electromagnetic wave signal traverses all or some of the paths between the N arrays.

12. The system of claim 11, wherein the electromagnetic wave signal traverses all or some of the paths between the N arrays in a reconfigurable manner.

13. The system of claim 11, wherein a $M_N$-th aperture in the N-th array is configured to send the electromagnetic wave signal to another aperture of the $M_1$ apertures in the first array after receiving the electromagnetic wave signal from the one or more apertures of the $M_1$ apertures in the first array.

14. The system of claim 11, wherein:

the one or more apertures of the $M_1$ apertures in the first array comprises each one of the $M_1$ apertures; and the one or more apertures of the $M_2$ apertures in the second array through the $M_N$ apertures in the N-th array comprises each one of the $M_2$ apertures in the second array through the $M_N$ apertures in the N-th array.

15. The system of claim 11, wherein the electromagnetic wave signal comprises a plurality of signals each having a different wavelength in a multi-wavelength system.

16. The system of claim 15, further comprising a dispersion compensation device configured to direct substantially all of the plurality of signals from one aperture to another aperture.

17. The system of claim 16, wherein the dispersion compensation device comprises a multi-wavelength beam directing device using an achromatic Fourier transform lens.

18. The system of claim 11, wherein the apertures in the first array and in at least one of the second array through the N-th array comprise volume holographic gratings, corner cube retroreflectors, diffraction gratings, mirrors, partial regenerators, or full regenerators.

19. The system of claim 11, wherein:

the apertures in the first array are located in one or more sets of one or more satellites; and the apertures in at least one of the second array through the N-th array are located in one or more sets of one or more satellites.

20. The system of claim 11, wherein the apertures in the first array through the N-th array are located within a substantially sealed cavity.

21. A system for extending a path length of an electromagnetic wave signal, the system comprising N arrays having $M_1$ through $M_N$ apertures, respectively, wherein:

$N > 2$, $M_1 > 2$, and each of $M_2$ through $M_N > 1$;

a first aperture in the second array is configured to send the electromagnetic wave signal to a first aperture in the first array;

one or more apertures of the $M_1$ apertures in the first array is configured to send the electromagnetic wave signal to one or more apertures of the $M_2$ apertures in the second array through the $M_N$ apertures in a N-th array, except that the first aperture in the first array is configured not to send the electromagnetic wave signal to the first aperture in the second array;

the one or more apertures of the first aperture in the second array through a $(M_N-1)$-th aperture in the N-th array, if $M_N > 2$, and through a $M_{N-1}$-th aperture in the (N−1)-th array, if $M_N = 1$, that receives the electromagnetic wave signal from the one or more apertures of the $M_1$ apertures in the first array is configured to redirect the received electromagnetic wave signal back to the one or more apertures of the $M_1$ apertures in the first array; and the electromagnetic wave signal traverses all or some of the paths between the N arrays.

22. The system of claim 21, wherein the electromagnetic wave signal traverses all or some of the paths between the N arrays in a reconfigurable manner.

23. The system of claim 21, wherein a $M_N$-th aperture in the N-th array is configured to send the electromagnetic wave signal to another aperture of the $M_1$ apertures in the first array after receiving the electromagnetic wave signal from the one or more apertures of the $M_1$ apertures in the first array.

24. The system of claim 21, wherein:

the one or more apertures of the $M_1$ apertures in the first array comprises each one of the $M_1$ apertures; and the one or more apertures of the $M_2$ apertures in a second array through the $M_N$ apertures in a N-th array comprises each one of the $M_2$ apertures in the second array through the MN apertures in the N-th array.

25. The system of claim 21, wherein the electromagnetic wave signal comprises a plurality of signals each having a different wavelength in a multi-wavelength system.

26. The system of claim 25, further comprising a dispersion compensation device configured to direct substantially all of the plurality of signals from one aperture to another aperture.

27. The system of claim 26, wherein the dispersion compensation device comprises a multi-wavelength beam directing device using an achromatic Fourier transform lens.

28. The system of claim 21, wherein the apertures in the first array and in at least one of the second array through the N-th array comprise volume holographic gratings, corner cube retroreflectors, diffraction gratings, mirrors, partial regenerators, or full regenerators.

29. The system of claim 21, wherein:

the apertures in the first array are located in one or more sets of one or more satellites; and the apertures in at least one of the second array through the N-th array are located in one or more sets of one or more satellites.

30. The system of claim 21, wherein the apertures in the first array through the N-th array are located within a substantially sealed cavity.

31. A method for extending a path length of an electromagnetic wave signal traversing between N arrays having $M_1$ through $M_N$ apertures, respectively, wherein $N > 2$, $M_1 > 2$, and each of $M_2$ through $M_N > 1$, the method comprising:

sending, by one or more apertures of the $M_1$ apertures in a first array, the electromagnetic wave signal to one or more apertures of the $M_2$ apertures in a second array through the $M_N$ apertures in a N-th array;

receiving, by the one or more apertures of the $M_2$ apertures in the second array through the $M_N$ apertures in the N-th array, the electromagnetic wave signal from the one or more apertures of the $M_1$ apertures in the first array;

redirecting, by the one or more apertures of the $M_2$ apertures in the second array through the $M_N$ apertures in the N-th array, the received electromagnetic wave signal back to the one or more apertures of the $M_1$ apertures in the first array; and the electromagnetic wave signal traversing all or some of the paths between the N arrays.

32. The method of claim 31, comprising the electromagnetic wave signal traversing all or some of the paths between the N arrays in a reconfigurable manner.

33. The method of claim 31, further comprising after receiving, by the one or more apertures of the $M_1$ apertures in the first array, the redirected electromagnetic wave signal from a $M_N$-th aperture in the N-th array, sending, by the one or more apertures of the $M_1$ apertures in the first array, the electromagnetic wave signal to another one of the $M_1$ apertures in the first array.

34. The method of claim 31, wherein:
the one or more apertures of the $M_1$ apertures in the first array comprises each one of the $M_1$ apertures; and
the one or more apertures of the $M_2$ apertures in the second array through the $M_N$ apertures in the N-th array comprises each one of the $M_2$ apertures in the second array through the $M_N$ apertures in the N-th array.

35. The method of claim 31, wherein the electromagnetic wave signal comprises a plurality of signals each having a different wavelength in a multi-wavelength system.

36. The method of claim 35, further comprising directing, by using a dispersion compensation device, substantially all of the plurality of signals from one aperture to another aperture.

37. The method of claim 36, wherein the dispersion compensation device comprises a multi-wavelength beam directing device using an achromatic Fourier transform lens.

38. The method of claim 31, wherein the apertures in the first array and in at least one of the second array through the N-th array comprise volume holographic gratings, corner cube retroreflectors, diffraction gratings, mirrors, partial regenerators, or full regenerators.

39. The method of claim 31, wherein:
the apertures in the first array are located in one or more sets of one or more satellites; and
the apertures in at least one of the second array through the N-th array are located in one or more sets of one or more satellites.

40. The method of claim 31, wherein the apertures in the first array through the N-th array are located within a substantially sealed cavity.

41. A method for extending a path length of an electromagnetic wave signal traversing between N arrays having $M_1$ through $M_N$ apertures, respectively, wherein $N>2$, $M_1>2$, and each of $M_2$ through $M_N>1$, the method comprising:
sending, by one or more apertures of the $M_1$ apertures in a first array, the electromagnetic wave signal to one or more apertures of the $M_2$ apertures in a second array through the $M_N$ apertures in a N-th array;
receiving, by the one or more apertures of a first aperture in the second array through a $(M_N-1)$-th aperture in the N-th array, if $M_N>2$, and through a $M_{N-1}$-th aperture in the (N−1)-th array, if $M_N=1$, the electromagnetic wave signal from the one or more apertures of the $M_1$ apertures in the first array;

redirecting, by the one or more apertures of the first aperture in the second array through the $(M_N-1)$-th aperture in the N-th array, if $M_N>2$, and through the $M_{N-1}$-th aperture in the (N−1)-th array, if $M_N=1$, the received electromagnetic wave signal back to the one or more apertures of the $M_1$ apertures in the first array; and the electromagnetic wave signal traversing all or some of the paths between the N arrays.

42. The method of claim 41, comprising the electromagnetic wave signal traversing all or some of the paths between the N arrays in a reconfigurable manner.

43. The method of claim 41, comprising after receiving, by a $M_N$-th aperture in the N-th array, the electromagnetic wave signal from the one or more apertures of the $M_1$ apertures in the first array, sending, by the $M_N$-th aperture in the N-th array, the electromagnetic wave signal to another aperture of the $M_1$ apertures in the first array.

44. The method of claim 41, wherein:
the one or more apertures of the $M_1$ apertures in the first array comprises each one of the $M_1$ apertures; and
the one or more apertures of the $M_2$ apertures in the second array through the $M_N$ apertures in the N-th array comprises each one of the $M_2$ apertures in the second array through the $M_N$ apertures in the N-th array.

45. The method of claim 41, wherein the electromagnetic wave signal comprises a plurality of signals each having a different wavelength in a multi-wavelength system.

46. The method of claim 45, further comprising directing, by using a dispersion compensation device, substantially all of the plurality of signals from one aperture to another aperture.

47. The method of claim 46, wherein the dispersion compensation device comprises a multi-wavelength beam directing device using an achromatic Fourier transform lens.

48. The method of claim 41, wherein the apertures in the first array and in at least one of the second array through the N-th array comprise volume holographic gratings, corner cube retroreflectors, diffraction gratings, mirrors, partial regenerators, or full regenerators.

49. The method of claim 41, wherein:
the apertures in the first array are located in one or more sets of one or more satellites; and
the apertures in at least one of the second array through the N-th array are located in one or more sets of one or more satellites.

50. The method of claim 41, wherein the apertures in the first array through the N-th array are located within a substantially sealed cavity.

51. A method for extending a path length of an electromagnetic wave signal traversing between N arrays having $M_1$ through $M_N$ apertures, respectively, wherein $N>2$, $M_1>2$, and each of $M_2$ through $M_N>1$, the method comprising:
sending, by a first aperture in the second array, the electromagnetic wave signal to a first aperture in the first array;
sending, by one or more apertures of the $M_1$ apertures in the first array, the electromagnetic wave signal to one or more apertures of the $M_2$ apertures in the second array through the $M_N$ apertures in a N-th array, except that the first aperture in the first array does not send the electromagnetic wave signal to the first aperture in the second array;

receiving, by the one or more apertures of the first aperture in the second array through a $(M_N-1)$-th aperture in the N-th array, if $M_N>2$, and through a $M_{N-1}$-th aperture in the (N−1)-th array, if $M_N=1$, the electromagnetic wave signal from the one or more apertures of the $M_1$ apertures in the first array, except that the first aperture in the second array does not receive the electromagnetic wave signal from the first aperture in the first array;

redirecting, by the one or more apertures of the first aperture in the second array through the $(M_N-1)$-th aperture in the N-th array, if $M_N>2$, and through the $M_{N-1}$-th aperture in the (N−1)-th array, if $M_N=1$, the received electromagnetic wave signal back to the one or more apertures of the $M_1$ apertures in the first array; and the electromagnetic wave signal traversing all or some of the paths between the N arrays.

52. The method of claim 51, comprising the electromagnetic wave signal traversing all or some of the paths between the N arrays in a reconfigurable manner.

53. The method of claim 51, comprising after receiving, by a $M_N$-th aperture in the N-th array, the electromagnetic wave signal from the one or more apertures of the $M_1$ apertures in the first array, sending, by the $M_N$-th aperture in the N-th array, the electromagnetic wave signal to another aperture of the $M_1$ apertures in the first array.

54. The method of claim 51, wherein:
the one or more apertures of the $M_1$ apertures in the first array comprises each one of the $M_1$ apertures; and
the one or more apertures of the $M_2$ apertures in a second array through the $M_N$ apertures in a N-th array comprises each one of the $M_2$ apertures in the second array through the $M_N$ apertures in the N-th array.

55. The method of claim 51, wherein the electromagnetic wave signal comprises a plurality of signals each having a different wavelength in a multi-wavelength system.

56. The method of claim 55, further comprising directing, by using a dispersion compensation device, substantially all of the plurality of signals from one aperture to another aperture.

57. The method of claim 56, wherein the dispersion compensation device comprises a multi-wavelength beam directing device using an achromatic Fourier transform lens.

58. The method of claim 51, wherein the apertures in the first array and in at least one of the second array through the N-th array comprise volume holographic gratings, corner cube retroreflectors, diffraction gratings, mirrors, partial regenerators, or full regenerators.

59. The method of claim 51, wherein:
the apertures in the first array are located in one or more sets of one or more satellites; and
the apertures in at least one of the second array through the N-th array are located in one or more sets of one or more satellites.

60. The method of claim 51, wherein the apertures in the first array through the N-th array are located within a substantially sealed cavity.

* * * * *